United States Patent [19]
Kim et al.

[11] Patent Number: 5,751,448
[45] Date of Patent: May 12, 1998

[54] METHODS OF OPERATING AN IMAGE FORMING APPARATUS HAVING A SHARED PAPER TRANSMISSION PATH

[75] Inventors: Yong-Geun Kim; Seong-Woo Kim, both of Suwon, Rep. of Korea

[73] Assignee: SamSung Electronics Co., Ltd., Suwon, Rep. of Korea

[21] Appl. No.: 583,592

[22] Filed: Jan. 5, 1996

[30] Foreign Application Priority Data

Jan. 7, 1995 [KR] Rep. of Korea ............. 231/1995

[51] Int. Cl.⁶ ............................. H04N 1/04; H04N 1/23
[52] U.S. Cl. ................. 358/498; 358/496; 358/296
[58] Field of Search ........................... 358/498, 496, 358/296, 300, 494, 474

[56] References Cited

U.S. PATENT DOCUMENTS

| | | | |
|---|---|---|---|
| 5,019,916 | 5/1991 | Ogura | 358/401 |
| 5,055,946 | 10/1991 | Kurahashi et al. | 358/498 |
| 5,124,800 | 6/1992 | Hashimoto | 358/296 |
| 5,173,785 | 12/1992 | Muramatsu | 358/498 |
| 5,359,425 | 10/1994 | Maehara et al. | 358/300 |
| 5,539,538 | 7/1996 | Terao | 358/498 |
| 5,559,609 | 9/1996 | Yamada et al. | 358/498 |

*Primary Examiner*—Scott Rogers
*Attorney, Agent, or Firm*—Robert E. Bushnell, Esq.

[57] ABSTRACT

An image forming apparatus operable in any one of a facsimile transmitting operation, facsimile receiving operation and a copy operation, wherein the image forming apparatus comprises a common paper transmission path. Paper, i.e., a document having an image thereon or a print paper to be printed on, is fed from a paper input part to the paper transmission path. A scanner, uses an image sensor, disposed along the paper transmission path generates an image signal by reading the image on the fed paper when the image forming apparatus is being operated in one of the facsimile transmitting or copy operations. The image signal is transmitted to a remote facsimile system when the image forming apparatus is being operated in the facsimile transmitting operation, or the image signal is converted to bit map data and stored when the image forming apparatus is being operated in the copy operation. A photosensitive drum and an image transfer part, disposed along the paper transmission path print an image received from the remote facsimile system when the image forming apparatus is being operated in the facsimile receiving operation, or prints an image stored as bit map data during the copy operation, on the fed paper. The paper transmission path has transmitting rollers for feeding the paper to the scanner, registration rollers for feeding the paper from the scanner to the printing part, and fixing rollers for discharging the paper from the printing part to an exit tray.

7 Claims, 3 Drawing Sheets

METHODS OF OPERATING AN IMAGE FORMING APPARATUS HAVING A SHARED PAPER TRANSMISSION PATH

CROSS REFERENCE TO RELATED APPLICATIONS

This application makes reference to, incorporates the same herein, and claims all benefits accruing under 35 U.S.C 517 119 from an application entitled An Image Forming Apparatus For Sharing Part of A Paper Transmission Path earlier filed in the Korean Industrial Property Office on 7 Jan. 1995, which was duly assigned Ser. No. 231/1995 by that Office.

BACKGROUND OF THE INVENTION

The present invention relates to an image forming apparatus for controlling a paper transmission path, and more particularly to an image forming apparatus for sharing a part of the paper transmission path necessary for performing a facsimile function, a copy function and a print function, while providing an image forming apparatus of miniaturized size.

Integrated types of equipment having various functions have been provided in pursuit of a more effective office environment and office automation. Typically, one proposed type of office equipment to be designed to perform various functions is the image forming apparatus having a facsimile function, a copy function and a print function. Conventionally, a facsimile system, a copy machine and a printer have been separately constructed independently used according to their respective dedicated functions; but owing to technology development and miniaturizing trends, efforts have been recently made to provide combined system which integrates the facsimile function with the print function, or the copy function with the print function. In general, the facsimile system also has a copy function. We have noticed that a common function of these three items of above three office equipment is the print function for forming an image onto a printing medium.

In general, the facsimile system has, at a minimum, a scanner for scanning data of a document to be transmitted; an assembly for printing the scanned data of the document; a control circuit for controlling all operations necessary for carrying out the transmission and reception functions of the facsimile system; and a power supply. Also, a copy machine has a scanner for scanning the image to be copied; an assembly for printing the scanned image; a control circuit for controlling all operations necessary for carrying out a copy function; and a power supply. Meanwhile, a printer has an input/output stage for receiving signals bearing image information from a computer and an assembly for printing the image information received; a control circuit that controls all operations necessary for performing the printing function; and a power supply. We have found that these three items of office equipment, that is, the facsimile system, the copy machine and the printer, each have the control circuit and the power supply as common components. It is our observations therefore, that if only components that are not common to the functions of all of these items, but which perform distinctive functions, could be combined with the control circuit, it could be possible to embody all three types of office equipment into a single, albeit multifunctional unit capable of carrying out the above three functions, that is, the facsimile function, the copy function and the print function. For example, a facsimile system such as the Model No. COFAX 5500 manufactured by SamSung Electronics Co., Ltd. has been generally equipped with a copy function.

Additionally, many kinds of the facsimile systems having other various functions have been already provided.

We have also noticed a problem attributable to the size of the combined equipment being still larger than some of the equipment which perform only one function, even though the size of the combined equipment is smaller than a combined total size of the facsimile system, the printer and the copy machine, the combined equipment unwieldy, with an excessively large foot print, thereby making it impossible to be miniaturized in size thereof.

Additionally, many kinds of the facsimile systems having various functions have been already provided. One such system is described in U.S. Pat. No. 5,019,916 to Masaaki Ogura and entitled Digital Copier With A Facsimile Function, which is incorporated herein by reference. Ogura's system uses separate paper paths; one path for the document to be read for facsimile transmission or copying operation, and another path for feeding sheets to a printing part when receiving a transmitted facsimile transmission from a remote facsimile system or the copying operation. Due to the use of separate paper paths, Ogura's system is not miniaturized.

SUMMARY OF THE INVENTION

It is therefore an object of the invention to provide an improve image forming apparatus and process for controlling apparatus.

It is another object to provide an image forming apparatus for sharing a part of a paper transmission path necessary for combining image formation functions of facsimile transmission and reception, document reproduction, and printing functions, to provide a miniaturized size for an image forming apparatus.

It is still another object to provide an image forming apparatus for sharing a partial section of both a paper transmission path for printing on a print medium and a paper transmission path for a document to be copied or transmitted as a facsimile message, to thereby provide a miniaturized size of the image forming apparatus.

It is yet another object to provide a process for controlling an image forming apparatus to enable sharing of a section of a path during conveyance of a printable medium for printing operations, for transmission and reception of facsimile messages, and for reproduction of images from a printed medium.

To achieve these and other objects, there is provided an image forming apparatus, constructed according to the principles of the present invention using a paper feed tray for feeding a document or print paper, and a scanner for scanning the document in order to generate an electrical signal corresponding to a two-dimensional image information of the document. A memory converts the electrical signal to a bit map and then stores the converted bit map. A printer prints data read from the memory onto the print paper and an exit roller discharges he document or the printed paper that has passed through an internal part of the image forming apparatus, to an exit tray. A controller establishes one of a copy mode, a facsimile transmitting mode or a facsimile receiving mode and then controls all operations related with the copy mode, the facsimile transmitting mode or the facsimile receiving mode. A feed roller advances the document or the print paper loaded onto the paper feed tray, to the exit roller. A paper path is configured to feed the document or the printed paper, which is loaded onto the paper feed tray, to the exit roller through the scanner and the printer by the feed roller.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE PREFERRED EMBODIMENT

Figure 1:
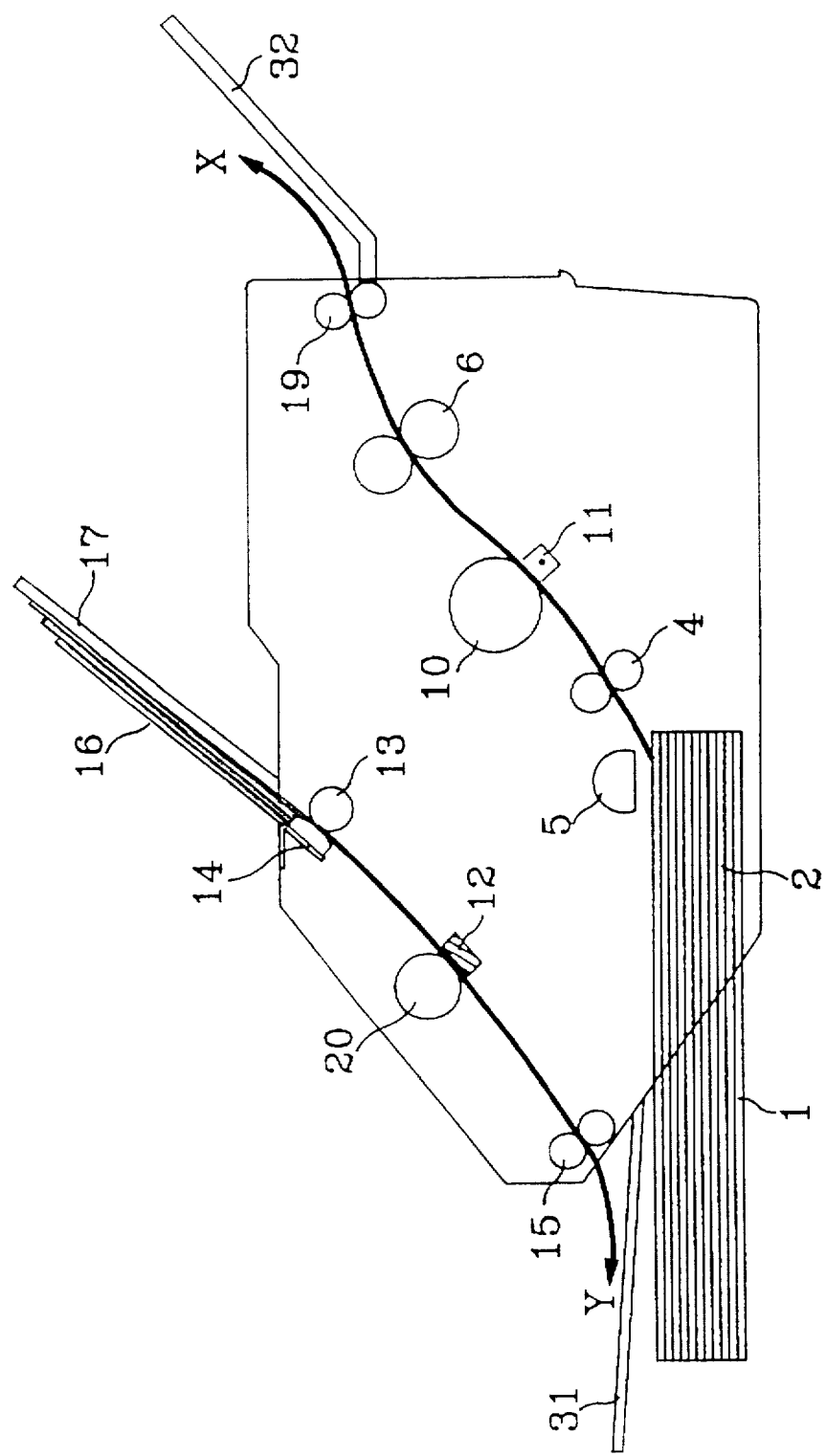
FIG. 1 is a sectional side view illustrating one type of an image forming apparatus.

Turning now to the drawings, FIG. 1 is a sectional side view illustrating an image forming apparatus combining a facsimile system and copy machine which integrates the facsimile function with the copy function. The paper transmission path of the combined facsimile system and copy machine is classified into two paths, that is, a transmission path "X" for blank paper to be printed upon and a transmission path "Y" for a printed document to be scanned, i.e., read.

The paper paths utilized for transmitting, receiving and copying in the facsimile system are respectively described as follows.

During facsimile transmission, a document 16 to be transmitted is loaded onto a document feed tray 17 and then a transmitting operation is performed by utilizing an operation panel (not shown). Document 16 is fed along path "Y" to an image sensor 12 and a white roller 20 by a feed roller 13 and a feed spring 14, and then the image on the document is electrically converted to an electrical signal, i.e., image signal, by image sensor 12. The document is then discharged to a document exit tray 31 through exit rollers 15. The image converted to an image signal is then transmitted to an exterior counterpart facsimile through a circuit component (not shown).

When receiving a facsimile, a signalized image received from a counterpart facsimile through the circuit component (not shown) is converted into an image signal, and print paper 2 to be printed on is feed along path "X". The image signal is transferred to a photosensitive drum by a transfer part 11. Feed roller 5 feeds print paper 2 from a paper loading part, i.e., a paper cassette, the feed tray or a manual paper feeding part, 1 through register rollers 4 to the photosensitive drum 10 to be printed upon. The printed paper is discharged to exit tray 32 through registration rollers 6 and discharge rollers 19.

During a copy operation, a document 16 to be copied is loaded on document feed tray 17 and then the copy operation is performed by utilizing the operation panel (not shown). Document 16 is fed through the "Y" path and the image on the document is read out by image sensor 12 and stored in a memory of the circuit part (not shown). Then, in order to complete the copy operation, the image is read from memory and transferred to photosensitive drum 10 by transfer unit 11. Print paper 2 is fed along path "X" so that the image on photosensitive drum 10 can be transferred to print paper 2 and discharged to exit tray 32 to complete the copy operation.

In the combined facsimile system and copy machine described above, the paths of the document and the print paper are different from each other, thereby doubling the space needed as compared to each individual device performing one of a facsimile, printing or copying operation. Accordingly, the separate paths act as an obstacle against the desired miniaturization of office equipment.

Figure 2:
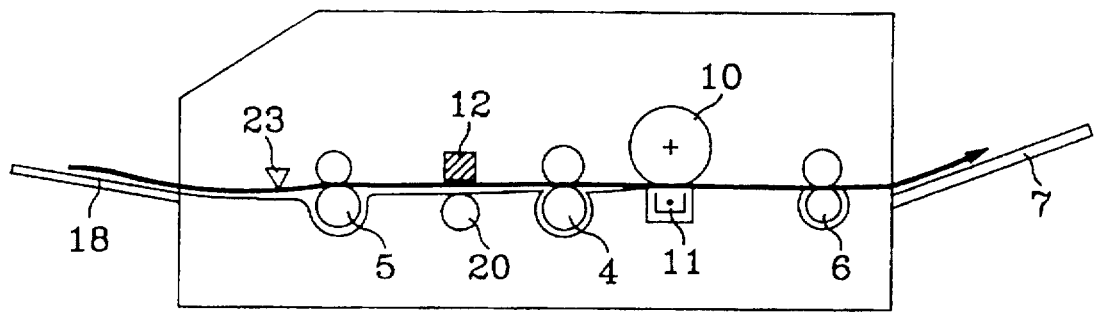
FIG. 2 is a sectional view illustrating a first embodiment of an image forming apparatus constructed according to the principles of the present invention.

Various embodiments of the present invention can be enacted. The most brief embodiment of the present invention is illustrated in FIG. 2. In a facsimile transmission operation a document is placed on feed tray 18, whereas in a facsimile reception operation a print paper is placed on feed tray 18. In a copying operation a document is first placed on feed tray 18, then after the document is scanned a print paper is placed on feed tray 18 to be printed on by photosensitive drum 10 in order to complete the copying operation. A document or print paper, i.e., paper, placed on feed tray 18 is sensed by sensor 23 to enable one of a facsimile transmission, facsimile reception and first step of copying operation to be performed. Transmitting rollers 5 provide the paper to image scanner 12 and roller 20 to be scanned during a facsimile transmission or copying operation. The paper is then fed to photosensitive drum 10 and transfer device 11 by roller 20 and register rollers 4, to be printed on during a facsimile reception or a final step of the copying operation. Drum 10 feeds the paper to fixing rollers 6 which in turn discharge the paper to exit tray 7. Accordingly, in the image forming apparatus shown in FIG. 2 the transmission path for a document and the transmission path for print paper are the same transmission path. The image forming apparatus of FIG. 2 has a disadvantage in that the operator must change the paper on feed tray 18 to be the document or the print paper depending on which operation the image forming apparatus is to be used, since the print paper and the document are transmitted from the same place.

Figure 3:
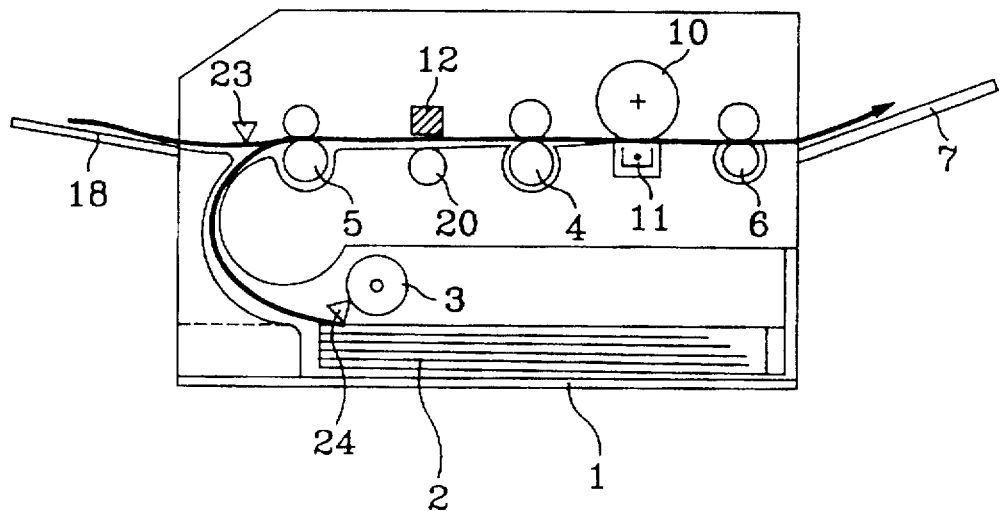
FIG. 3 is a sectional view illustrating a second embodiment of an image forming apparatus constructed according to the principles of the present invention.

FIG. 3 is a sectional view illustrating a preferred embodiment of the image forming apparatus according to the principles of the present invention. In the image forming apparatus of FIG. 3 the document is loaded from feed tray 18 whereas print paper 2 is loaded from paper cassette 1. The image forming apparatus of FIG. 3 is an improvement over that of FIG. 2 because the operator does not have to intervene during, for example, the copying operation. Components parts utilized in the paper transmission path of the image forming apparatus of FIG. 3, to be hereinafter described, are the same as the components in the paper transmission path of the image forming apparatus of FIG. 2.

A scanner provided with image sensor 12, for reading an image on a document, and roller 20 is situated between transmitting rollers 5 and a registration rollers 4 in the image forming apparatus of FIG. 3. The scanner, however, can be situated in any place along the paper transmission path, but it is preferred that scanner be situated as shown in FIG. 3. The apparatus in FIG. 3 further incorporates a paper cassette 1, a paper sensor 24 for sensing a front portion of the print paper disposed to be fed from paper cassette 1, and a feed roller 3 for providing print paper from cassette 1 to transmitting rollers 5. Furthermore, the image forming apparatus of FIG. 3 having a cassette 1, a manual paper feed tray 18 and an exit tray 7 is described as follows. Paper cassette 1 and manual paper feed tray 18 can be respectively utilized as a print paper loading part and a document loading part. In the following description, it is assumed that the manual paper feed tray 18 is utilized as the document loading part.

Also, the manual paper feed tray 18 can be optionally utilized as a print paper loading part as described with regard to FIG. 2. As an example of the image forming apparatus of FIG. 3, the operation of the facsimile system is described as follows in conjunction with FIG. 4.

Figure 4:
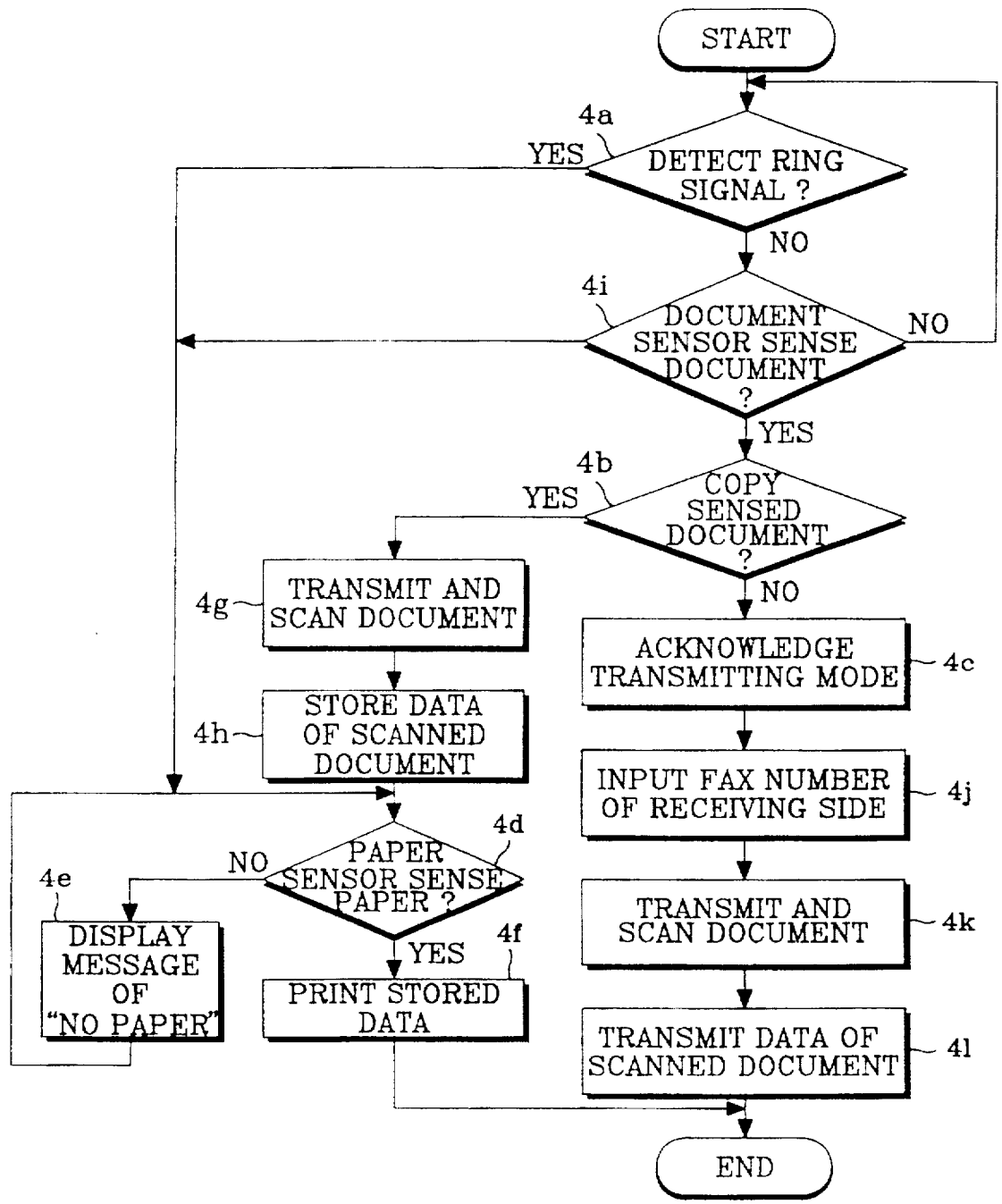
FIG. 4 is a flow chart illustrating a process of controlling of a printable medium transmission according to the principles of the present invention.

When receiving a facsimile, the scanner provided with the image sensor 12 is not operated and print paper 2 is only passed through the scanner. In other words, transfer part 11 transfers an image to photosensitive drum 10 and print paper 2, detected by paper sensor 24, is fed by feed roller 3 to transmitting rollers 5 and transmitted through registration rollers 4 to photosensitive drum 10, photosensitive drum 10 prints an image on print paper 2 and feeds the printed paper to fixing rollers 6 which transfer the printed paper to exit tray 7. These operations are described in FIG. 4, steps 4a and 4d–4f. In FIG. 4, a facsimile receiving mode is confirmed by detecting a ring signal over a telephone line (not shown) in the step 4a, after which step 4 d is performed. In step 4 d a check is made as to whether or not paper sensor 24 senses print paper 2. When print paper 2 is sensed, step 4f executing a printing operation is performed. When print paper 2 is not sensed in the step 4d, thus indicating that there is no print paper in paper cassette 1, a message of "No Paper" is displayed through a displaying part (not shown) in step 4e. The message of "No Paper" is continuously displayed until print paper is detected by paper sensor 24.

When transmitting a facsimile, a document to be transmitted is loaded on feed tray 18 and detected by paper sensor 23. The document is then fed by transmitting rollers 5 to the scanner wherein image sensor 12 converts the image on the document to an image signal while roller 20 feeds the document to registration rollers 4. The image signal may be stored in an internal memory for later transmission or may be directly transmitted to a counterpart facsimile system by a transmitting part (not shown). The scanned document is then fed past photosensitive drum 10, which is not in an operational state during a facsimile transmitting operation, to fixing rollers 6 which discharge the document to exit tray 7. The facsimile transmission operation will be described with respect FIG. 4, as follows. When a ring signal is not detected in the step 4a and paper sensor 23 indicates a document is sensed in the step 4i, a check is made in step 4b to determine whether the document is being provided during a copying made or a facsimile transmission mode. When step 4b determines that the copy mode is not the intended mode of operation of the apparatus, step 4c is performed to acknowledge the facsimile transmitting mode. Upon acknowledgment of the facsimile transmission mode, the facsimile telephone number of the counterpart facsimile system is input through the operation panel (not shown) in the step 4j. In step 4k the counterpart facsimile telephone number is transmitted, and upon receipt of an acknowledgment signal transmitted by the counterpart facsimile system, the document detected by sensor 23 is then fed along the paper path, as discussed above, to execute the image reading operation. In step 4l, the image signal or the image data read from memory and converted to an image signal is transmitted to the counterpart facsimile system.

A copy operation is described as follows. During a scanning mode of the copy operation, the document to be copied is loaded on manual paper feed tray 18 and detected by paper sensor 23. The document is then fed by transmitting rollers 5 to the scanner wherein image sensor 12 converts the image on the document to an image signal while roller 20 feeds the document to registration rollers 4. The image signal is simultaneously stored during the scanning operation in an internal memory (not shown). The scanned document is then fed past photosensitive drum 10, which is not in an operational state during the scanning mode of the copy operation, to fixing rollers 6 which discharge the document to exit tray 7 At this time, the print mode of the copy operation is performed wherein the image data stored in the internal memory is provided to transfer part 11 which transfers an image to photosensitive drum 10. During the print mode of the copy operation image sensor 12 is not operated. Print paper 2, detected by paper sensor 24, is fed by feed roller 3 to transmitting rollers 5 and transmitted through registration rollers 4 to photosensitive drum 10, photosensitive drum 10 prints an image on print paper 2 and feeds the printed paper to fixing rollers 6 which transfer the printed paper to exit tray 7. The copy operation will be described with respect FIG. 4, as follows. When a ring signal is not detected in the step 4a and paper sensor 23 indicates a document is sensed in the step 4i, a check is made in step 4b to determine whether the document is being provided during a copying mode or a facsimile transmission mode. When step 4b determines that the copy mode is the intended mode of operation of the apparatus, step 4g, wherein the document is transmitted along the paper path and scanned during the scanning mode as described above, is performed. The image signal generated during the scanning step is stored as image data in the internal memory (not shown) during step 4h. After the document has been stored in memory, step 4d is performed wherein a check is made to determine whether or not paper sensor 24 senses print paper 2. When print paper 2 is sensed, step 4f for executing the print mode described above is performed. When print paper 2 is not sensed in the step 4d, thus indicating that there is no print paper in paper cassette 1, a message of "No Paper" is displayed through a displaying part (not shown) in step 4e. The message of "No Paper" is continuously displayed until print paper is detected by paper sensor 24.

When a document is comprised of several pages, i.e., several sheets, the copy operation can be performed in two ways. One way is that as each sheet of the document is read during the scanning mode the print mode can be performed immediately following scanning of each sheet such that one or more copies of the scanned sheet will be printed before the scanning of a next sheet of the document. Alternatively, provided the internal memory has a large capacity, all the sheets of the document are read during the scanning mode and stored in memory, then the document can be printed in its entirety during the print mode wherein the document can be printed one or more times as desired.

As described in the above, the manual paper feed tray 18 is more convenient as the document loading part than the paper feed tray, that is, the paper cassette 1. It is possible, however to have an apparatus without feed tray 18 and paper sensor 23 wherein the document is provided on top of the print paper in paper cassette 1 during the facsimile transmitting operation and the copying operation. In such an apparatus, the operator would input the number of pages of which the document is comprised through the control panel (not shown). During the facsimile operation, the pages of the document are counted as they are scanned and when the number of counted pages corresponds to the number input by the operator, no more papers are fed from paper cassette 1. During the copy operation, the pages of the document are counted as they are scanned during the scanning mode, and when the number of counted pages corresponds to the number input by the operator, the print mode is performed.

As set forth in the forgoing, there is provided an image forming apparatus according to the principles of the present invention for at least sharing a part of a paper transmission path necessary for performing a facsimile transmission operation, a facsimile receiving operation and a copy operation, thereby to provide the image forming apparatus of miniaturized size.

While there have been illustrated and described what are considered to be preferred embodiments of the present invention, it will be understood by those skilled in the art that various changes and modifications may be made, and equivalents may be substituted for elements thereof without departing from the true scope of the present invention. The embodiment of the present invention illustrates the combined equipment, but is of course applicable to all machines having the scanner and the print function irrespective of the copy machine, the facsimile system or the combined equipment having all the copy function or the facsimile function in the same manner. Therefore, the scope of the present invention should not be limited to the described embodiment, and it should be determined by the claims and the equivalent thereof.

What's claimed is:

1. A method for operating an image forming apparatus having a common paper transmission path in one of a facsimile transmitting operation, a facsimile receiving operation and a copy operation, said method comprising the steps of:

feeding a paper through said paper transmission path;

reading an image on said paper fed through said paper transmission path during said facsimile transmitting operation;

reading an image on said paper fed through said paper transmission path during a scanning mode of said copy operation;

printing an image on said paper fed through said paper transmission path during said facsimile receiving operation;

printing an image on said paper fed through said paper transmission path during a printing mode of said copy operation;

determining whether a ring signal indicative of said facsimile receiving operation is received over a telephone line;

sensing whether paper is available to be printed on when said ring signal is received;

displaying a message indicating that no paper is available to be printed on when said step of sensing fails to sense any paper being available to be printed on;

performing said step of feeding said paper through said paper transmission path when said step of sensing senses that paper is available to be printed on;

sensing whether paper is available to be read when said ring signal is not received; and determining whether said image forming apparatus is to be operated in said copy operation, discharging said paper from said paper transmission path to an exit tray.

2. The method as set forth in claim 1, further comprising the steps of:

performing said step of feeding said paper through said paper transmission path when it is determined that said image forming apparatus is to be operated in said copy operation;

generating an image signal during said step of reading said image on said paper fed through said paper transmission path during said scanning mode of said copy operation;

converting said image signal to bit map data;

storing said bit map data in a memory location;

sensing whether paper is available to be printed on;

displaying a message indicating that no paper is available to be printed on when said step of sensing fails to sense any paper being available to be printed on; and performing said step of printing an image on said paper fed through said paper transmission path during said printing mode of said copy operation by outputting said bit map data from said memory location, said bit map data representing said image to be printed on said paper.

3. The method as set forth in claim 1, further comprising the steps of:

acknowledging that said image forming apparatus is to be operated in said facsimile transmitting mode;

inputting a facsimile telephone number for dialing and accessing a remote facsimile system;

performing said step of feeding said paper through said paper transmission path when said remote facsimile system is accessed;

generating an image signal during said step of reading said image on said paper fed through said paper transmission path during said facsimile transmitting operation; and transmitting said image signal to said remote facsimile system.

4. A method of operating an image forming apparatus having a common paper transmission path in one of a facsimile transmitting operation, a facsimile receiving operation and a copy operation, said method comprising the steps of:

checking for reception of a ring signal indicative of said facsimile receiving operation;

checking a first paper sensor at a beginning of said paper transmission path to determine whether a document is available to be read when said ring signal is not received;

returning to said step of checking for reception of a ring signal when said first paper sensor indicates that no document is available to be read;

determining whether said image forming apparatus is to perform said copy operation when said first paper sensor indicates that said document is available to be read;

acknowledging and performing said facsimile transmitting operation when said step of determining whether said image forming apparatus is to perform said copy operation determines that said image forming apparatus is not to perform said copy operation;

transmitting said document along said paper transmission path and scanning said document when said step of determining whether said image forming apparatus is to perform said copy operation determines that said image forming apparatus is to perform said copy operation;

storing information obtained during said scanning of said document;

checking a second paper sensor to determine whether print paper is available to be printed on when said ring signal is received or when said step of storing information obtained during said scanning of said document is completed;

transmitting said print paper through said paper transmission path and printing an image on said print paper when said second paper sensor determines that print paper is available;

discharging said print paper from said paper transmission path to an exit tray.

5. The method as set forth in claim 4, wherein said step of performing said facsimile transmitting operation comprises the steps of:

inputting a facsimile telephone number for dialing and accessing a remote facsimile system;

feeding said document through said paper transmission path when said remote facsimile system is accessed;

scanning said document and generating an image signal during while feeding said document through said paper transmission path; and transmitting said image signal to said remote facsimile system.

6. The method as set forth in claim 4, wherein said step of storing comprises the steps of:

converting said information obtained during said scanning of said document to bit map data; and storing said bit map data in a memory location.

7. The method as set forth in claim 4, further comprising a step of displaying a message indicating that no paper is available to be printed on when said second paper sensor determines that print paper is not available and returning to said step of checking said second paper sensor.

* * * * *